(12) United States Patent
Kawaguchi et al.

(10) Patent No.: US 10,941,299 B2
(45) Date of Patent: Mar. 9, 2021

(54) HEAT INSULATION COATING FOR INTERNAL COMBUSTION ENGINES AND PROCESS FOR FORMING THE SAME

(71) Applicant: TOYOTA JIDOSHA KABUSHIKI KAISHA, Toyota (JP)

(72) Inventors: Akio Kawaguchi, Sunto-gun (JP); Yoshiaki Kajikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/576,209

(22) Filed: Sep. 19, 2019

(65) Prior Publication Data
US 2020/0140699 A1    May 7, 2020

(30) Foreign Application Priority Data
Nov. 5, 2018    (JP) .................... 2018-207934

(51) Int. Cl.
| | |
|---|---|
| *C09D 1/02* | (2006.01) |
| *C09D 7/61* | (2018.01) |
| *F02B 77/11* | (2006.01) |
| *C09D 1/00* | (2006.01) |
| *C08K 7/26* | (2006.01) |

(52) U.S. Cl.
CPC ............... *C09D 1/02* (2013.01); *C08K 7/26* (2013.01); *C09D 1/00* (2013.01); *C09D 7/61* (2018.01); *F02B 77/11* (2013.01); *C08K 2201/005* (2013.01)

(58) Field of Classification Search
CPC ... C09D 7/61; C09D 1/00; C09D 1/02; C08K 7/26; C08K 2200/005; F02B 77/11; F02B 77/02; C01B 33/1585
USPC .......................................................... 123/668
See application file for complete search history.

(56) References Cited

U.S. PATENT DOCUMENTS

| | | | | |
|---|---|---|---|---|
| 4,037,751 A | * | 7/1977 | Miller .................... | F16L 59/00 428/593 |
| 4,402,927 A | * | 9/1983 | von Dardel ......... | C04B 38/0045 423/335 |
| 2013/0196137 A1 | * | 8/2013 | Evans .................... | B32B 19/06 428/292.1 |
| 2013/0255651 A1 | * | 10/2013 | Nomura ................... | F02F 1/00 123/668 |
| 2017/0029681 A1 | | 2/2017 | Kim et al. | |
| 2017/0283269 A1 | * | 10/2017 | Kotake .................... | B32B 9/00 |
| 2019/0145571 A1 | * | 5/2019 | Oikawa .................. | D04H 1/413 442/136 |

FOREIGN PATENT DOCUMENTS

| | | | |
|---|---|---|---|
| DE | 10211331 A1 * | 10/2003 | .............. E04F 21/12 |
| EP | 2175116 A1 | 4/2010 | |
| JP | 2017-031386 A | 2/2017 | |
| WO | 2009/020206 A1 | 2/2009 | |

* cited by examiner

*Primary Examiner* — Mahmoud Gimie
(74) *Attorney, Agent, or Firm* — Oliff PLC

(57) ABSTRACT

The heat insulation coating includes the particles (secondary particles) of the silica aerogel (i) and the silica-based binder (ii). The thickness of the heat insulation coating is several 10 to several 100 μm. The particle size of the secondary particles is distributed in a range from the lower limit Rmin to the upper limit Rmax. The lower limit Rmin is 10 nm. The upper limit Rmax is equal to the coating thickness of the heat insulation coating.

7 Claims, 4 Drawing Sheets

HEAT INSULATION COATING FOR INTERNAL COMBUSTION ENGINES AND PROCESS FOR FORMING THE SAME

CROSS-REFERENCE TO RELATED APPLICATION

The present disclosure claims priority under 35 U.S.C. § 119 to Japanese Patent Application No. 2018-207934, filed on Nov. 5, 2018. The content of the application is incorporated herein by reference in their entirety.

TECHNICAL FIELD

The present disclosure relates to a heat insulation coating for internal combustion engine and a process for forming the heat insulation coating.

BACKGROUND

WO2009/020206A1 discloses an internal combustion engine with a heat insulation coating. The heat insulation coating is formed on a wall of a combustion chamber. The heat insulation coating includes a first and a second heat insulators. The first insulator is made of a material having a high heat insulating property such as silica aerogel. The second insulator is made of a material having high strength such as ceramics and an organosilicon compound. Therefore, this heat insulation coating has high heat insulating property and high strength.

WO2009/020206A1 also discloses an example in which grain size of the first insulator is made uneven and a mixing ratio of the first insulator to entire coating is changed in accordance with a site of the heat insulating coating. If the mixing ratio is changed, the heat insulation property and the strength are changed according to the position of the heat insulation coating. Therefore, it is possible to perform fine adjustment such as increasing the mixing ratio at sites where heat insulation properties are required, and decreasing the mixing ratio at a site where strength is required.

However, if the mixing ratio is increased in order to improve the heat insulation property, the strength is lowered accordingly. Therefore, it is practically difficult to greatly increase the mixing ratio. In addition, if the mixing ratio is reduced in order to increase the strength, the heat insulation property is lowered accordingly, and it becomes difficult to achieve the original purpose of the heat insulation coating. Thus, there is a practical problem that cannot be avoided in order to determine the optimum mixing ratio. Further, considering that the object of coating is a narrow range of the wall surface of the combustion chamber, it is practically difficult to perform fine adjustment by changing the mixing ratio in accordance with the position of the heat insulation coating.

The present disclosure addresses the above described problem, and one object of the present disclosure is, to provide a heat insulation coating having excellent thermal barrier properties and strength. It is another object of the present disclosure to provide a process for forming a heat insulation coating of practical use.

SUMMARY

A first aspect of the present disclosure is a heat insulation coating for internal combustion engine, and has the following features.

The heat insulation coating is formed to a predetermined thickness on a wall surface of a combustion chamber.

The heat insulation coating comprising particles of a silica aerogel having a particle diameter distributed in a predetermined range, and a silica-based binder that binds the particles of the silica aerogel to each other.

A lower limit of the predetermined range is several 10 nm.

An upper limit of the predetermined range is 10 μm or more, and is equal to the predetermined thickness.

A second aspect of the present disclosure further has the following features in the first aspect.

The particles of the silica aerogel are composed of a small diameter group having a particle diameter smaller than several 100 nm and a large diameter group having a particle diameter larger than several 100 nm.

Total number of the particles of the silica aerogel belonging to the small diameter group is $10^4$ and $10^5$ times that of the silica aerogel belonging to the large diameter group.

A third aspect of the present disclosure has the following features in the first aspect.

The particles of the silica aerogel and the silica-based binder constitute an inner layer.

Interstices formed between the particles of the silica aerogel form openings in a surface of the inner layer.

A silica-based outer layer for sealing the openings is formed on the surface.

A fourth aspect of the present disclosure further has the following features in the first aspect.

The heat insulation coating further comprises particulate amorphous silica provided in interstices formed between the particles of the silica aerogel.

A fifth aspect of the present disclosure is a process for forming a heat insulation coating for internal combustion engine, and has the following features.

The heat insulation coating is formed to a predetermined thickness on a wall surface of a combustion chamber.

The process comprising the steps of;

classifying particles of prepared silica aerogel into particles having a particle size within a predetermined range;

preparing a slurry including the particles of the classified silica aerogel and an aqueous solution of a siliceous inorganic binder; and applying the prepared slurry to the wall surface.

A lower limit of the predetermined range is several 10 nm.

An upper limit of the predetermined range is 10 μm or more, and is equal to the predetermined thickness.

A sixth aspect of the present disclosure further has the following feature in the fifth aspect.

The slurry further includes particulate amorphous silica having a particle diameter of several 10 to several 100 nm.

A seventh aspect of the present disclosure further has the following feature in the fifth aspect.

The process further comprises the step of hydrophobizing the classified silica aerogel particles between the step of classifying the particles of prepared silica aerogel and the step of preparing the slurry.

According to the first aspect, the particle diameter of the silica aerogel included in the heat insulation coating is distributed in the predetermined range. The lower limit of the predetermined range is several 10 nm while the upper limit of the predetermined range is at least 10 mm. That is, particles of various sizes are mixed in the heat insulation coating. When particles of various sizes are mixed, it is possible to increase filling rate of the particles in the heat insulation coating as compared with a case where only particles having uniform particle diameters are present. If the filling rate of the particles is increased, it is possible to increase strength of the heat insulation coating having a high heat-insulating property derived from the silica aerogel.

According to the second aspect, the total number of the particles of the silica aerogel belonging to the small diameter group is $10^4$ and $10^5$ times that of the silica aerogel belonging to the large diameter group. When relationship of the total number of particles is such a relation, a dense structure in which the particles belonging to the small diameter group are inserted into gaps formed between the particles belonging to the large diameter group is formed. Therefore, it is possible to further increase the filling rate of the particles. Therefore, it is possible to further increase the strength of the heat insulation coating.

According to the third aspect, an outermost surface is formed of the silica-based outer layer. Interstices formed between the particles of the silica aerogel. When the interstices are exposed, then the interstices form openings through which external gas is able to enter the inside of the heat insulation coating. In this respect, if the outermost surface is formed of the silica-based outer layer, gas barrier properties is imparted.

According to the fourth aspect, the particulate amorphous silica is provided in the interstices formed between the particles of the silica aerogel. A structure in which the particulate amorphous silica is assembled has a lower porosity than that in which the silica aerogel particles are assembled. Here, the relatively low porosity means that the structure is relatively robust. Therefore, when the particulate amorphous silica is provided, it is possible further to increase the strength of the heat insulation coating.

According to the fifth aspect, by the step of classifying particles whose particle diameters belong to a predetermined range, it is possible to form a heat insulation coating in which particles of various sizes are mixed. Since the classification of the particles of the silica aerogel itself is not a complicated process, there is no problem in terms of practical use. In addition, the upper limit of the predetermined range is equal to the predetermined thickness. Therefore, it is possible to prevent in advance heat flow rate from increasing due to an increase in surface area of the heat insulation coating that is caused by unevenness in size of the particles of the silica aerogel thereon.

According to the sixth aspect, particulate amorphous silica having the particle diameter of several 10 to several 100 nm is added to the slurry. As mentioned above, structure in which the particulate amorphous silica is assembled is more robust than that in which the silica aerogel particles are assembled. Therefore, it is possible to increase the strength of the heat insulation coating.

According to the seventh aspect, before the step of preparing the slurry, the hydrophobizing of the particles of the classified silica aerogel is performed. When the hydrophobizing is performed, it is possible to suppress binder component from entering the interstices of the particles of the silica aerogel in the step of preparing the slurry. Therefore, it is possible to suppress the interstices from being blocked.

DESCRIPTION OF EMBODIMENT

Figure 1:
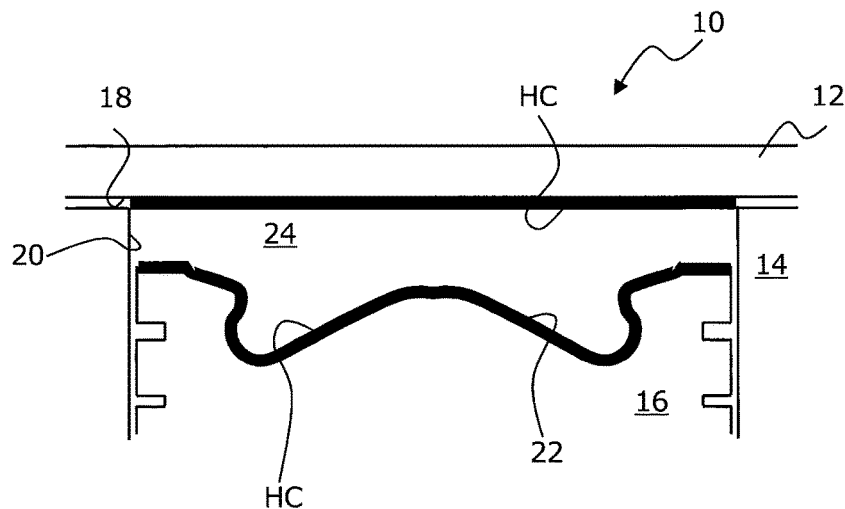
FIG. 1 is a diagram for explaining an example of a configuration of an internal combustion engine to which a heat insulation coating according to an embodiment of the present disclosure is applied.

Embodiments of the present disclosure will be described below with reference to the drawings. Note that elements common to the respective drawings are denoted by the same reference numerals, and a repetitive description thereof is omitted. The present disclosure is not limited to the following embodiments.

First, an embodiment of a heat insulation coating for internal combustion engine according to the present disclosure will be described with reference to FIGS. 1 to 7.

1. Configuration Example of Internal Combustion Engine

FIG. 1 is a diagram for explaining a configuration example of the internal combustion engine (hereinafter also referred to as "engine") to which the heat insulation coating according to the present embodiment is applied. The engine 10 shown in FIG. 1 is a compression self-ignition type engine mounted on a vehicle. However, the configuration of the engine is not particularly limited, and the heat insulation coating may be applied to a spark ignition type engine.

As shown in FIG. 1, the engine 10 includes a cylinder head 12, a cylinder block 14, and a piston 16. The cylinder head 12 is attached to the cylinder block 14 via a gasket (not shown). The piston 16 moves up and down in a cylinder which is formed in the cylinder block 14.

A space enclosed by a bottom surface 18 of the cylinder head 12, an inner peripheral surface 20 of the cylinder block 14, and a top surface 22 of the piston 16 forms a combustion chamber 24. That is, a wall surface of the combustion chamber 24 is composed of the bottom surface 18, the inner peripheral surface 20, and the top surface 22. A cavity 26 is formed in a center of the top surface 22. The cavity 26 is also part of the combustion chamber 24.

In FIG. 1, a heat insulation coating HC is formed on the bottom surface 18 and the top surface 22. However, the heat insulation coating HC may be formed only on one of the bottom surface 18 and the top surface 22. The heat insulation coating HC may be formed on the inner peripheral surface 20 in addition to the bottom surface 18 and the top surface 22. That is, the heat insulation coating HC may be formed on at least one of the bottom surface 18, the inner peripheral surface 20, and the top surface 22.

2. Configuration Example of Heat Insulation Coating

The heat insulation coating HC includes particles of silica aerogel and a silica-based binder. Particle size of the silica aerogel is distributed in a predetermined range. The silica-based binder binds the particles of the silica aerogel together.

2.1 First Configuration Example

Figure 2:
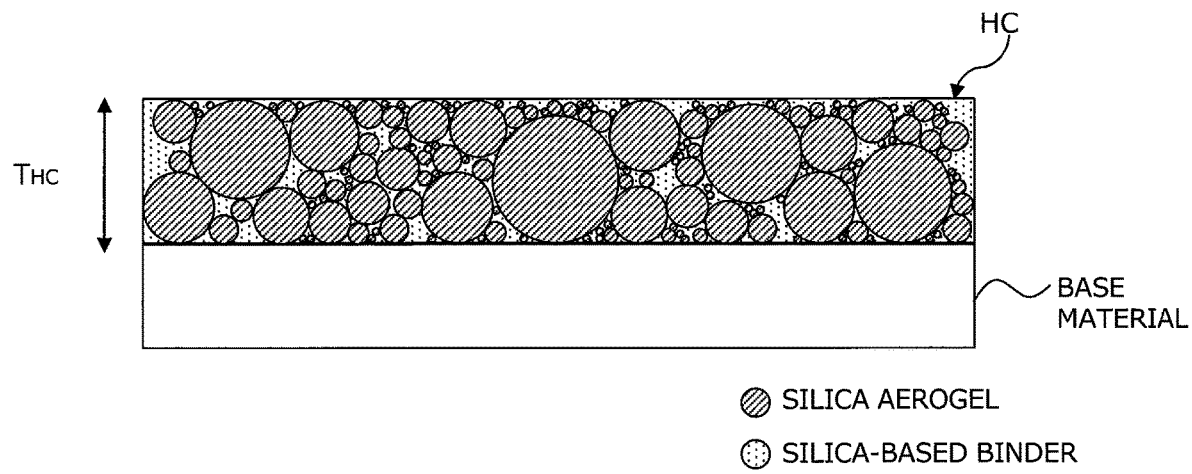
FIG. 2 is a schematic diagram for explaining a first configuration example of a heat insulation coating HC.

FIG. 2 is a schematic diagram for explaining a first configuration example of the heat insulation coating HC. As shown in FIG. 2, the heat insulation coating HC is formed on the surface of a base material. The base material is a member constituting the wall surface of the combustion chamber 24. Examples of the base material include an aluminum alloy and an iron alloy. The heat insulation coating HC shown in FIG. 2 includes the particles of the silica aerogel (i) and the silica-based binder (ii). Thickness of the heat insulation coating HC (hereinafter also referred to as "coating thickness $T_{HC}$") is several 10 to several 100 μm.

(i) Silica Aerogel

Silica aerogels are low-density structures of silica gels (dry gels) in which solvents contained in the gels are replaced by gases by drying. The silica aerogel is obtained using a supercritical drying method. However, the silica aerogel may contain silica xerogel obtained by an evaporative drying method or silica cryogel obtained by a freeze-drying method.

Figure 3:
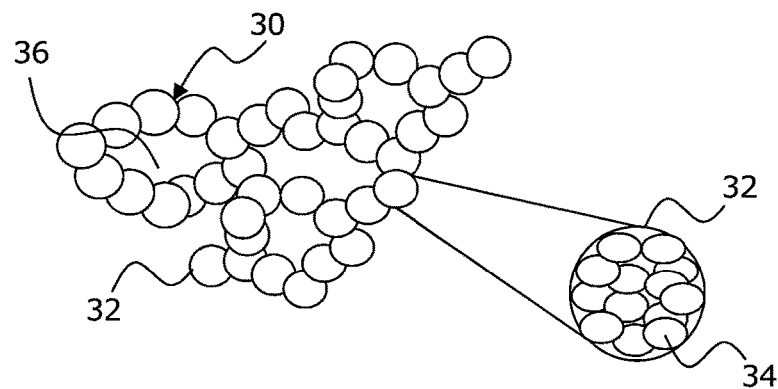
FIG. 3 is a schematic view of a structure of a silica aerogel.

FIG. 3 is a schematic view of a structure 30 of the silica aerogel. As shown in FIG. 3, the structure 30 is composed of an aggregate of particles 32. The particles 32 are secondary particles formed by aggregating primary particles 34 of silica ($SiO_2$) having a mean particle diameter of about several nanometers.

Hereinafter, the particles 32 are also referred to as "secondary particles 32". Although "primary particle" and "secondary particle" appear in this specification, the "particle" and "particle diameter" used without special mention refer to "secondary particle" and "secondary particle diameter". Average particle diameter of the secondary particles 32 is several 100 to several 1000 nm. Between the secondary particles 32, interstices 36 of several 10 nm is formed. By the interstices 36, the structure 30 has a three-dimensional network structure.

The interstices 36 may be filled with gas. However, the interstices 36 are not necessarily connected to each other. Even if an internal path is formed by connecting the interstices 36, the internal passage is configured in a complicated manner. Therefore, gas movement within the structure 30 is basically inhibited.

Therefore, according to the configuration of the structure 30, it is possible to decrease thermal conductivity of the heat insulation coating HC to a low level. It is also possible to reduce heat capacity per unit volume (hereinafter also referred to as "volume heat capacity") of the heat insulation coating HC to a low level. In other words, according to the configuration of the structure 30, it is possible to impart a high heat insulation property to the heat insulation coating HC.

Here, a structure in which hollow silica beads are assembled is exemplified as another silica-based structure exhibiting the same heat insulation property as that of the structure 30. The hollow silica beads have voids therein. Therefore, the structure of the hollow silica beads as a whole exhibits a high heat insulation property. However, if a hollow silica bead having a large size is cracked for some reason, there is a concern that the strength of the structure is lowered.

In this regard, in the structure 30, there is no relationship between the size of the secondary particles 32 and the size of the interstices 36. In other words, although total number of vacancies in the secondary grains 32 increases as size of the secondary grains 32 increases, the size of the individual interstices 36 is more or less constant (i.e., several 10 nm). Therefore, according to the structure 30, reliability of the heat insulation coating HC can be improved as compared with a case where the structure of the hollow silica beads is used.

Figure 4:
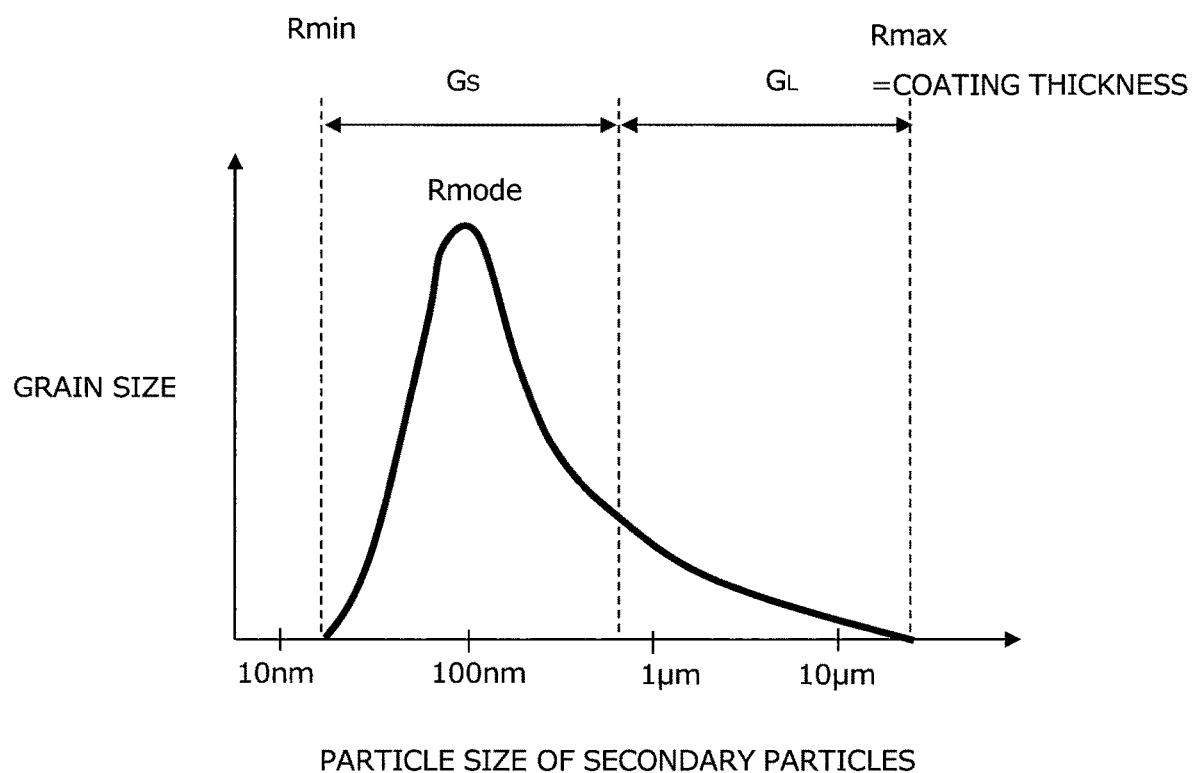
FIG. 4 is an example of particle size distribution of secondary particles of the silica aerogel.

FIG. 4 is a diagram for showing an example of particle size distribution (grain size distribution) of the secondary particles 32. As shown in FIG. 4, the particle size of the secondary particles 32 is distributed in a range from the lower limit Rmin to the upper limit Rmax.

The lower limit Rmin is 10 nm. The smaller the lower limit Rmin becomes, the higher the filling rate of the secondary particles in the heat insulation coating HC increases. However, secondary particles having a very small diameter smaller than the lower limit Rmin are more strongly affected by van der Waals forces than gravitational forces. Therefore, the secondary particles having the very small diameter tend to agglomerate with each other. As a result, dispersibility of the secondary particles decreases during preparation of slurry. For this reason, the secondary particles having a particle diameter less than the lower limit Rmin are not included in the structure 30.

The upper limit Rmax is equal to the coating thickness $T_{HC}$ of the heat insulation coating HC. When the upper limit Rmax exceeds the coating thickness $T_{HC}$, irregularities due to the sizes of the secondary particles are generated on the surface of the heat insulation coating HC, and as a result, the heat flow rate of the heat insulation coating HC is increased by increasing the surface area of the heat insulation coating HC. As a result, the heat insulation property of the heat insulation coating HC is lowered. This problem can be solved by smoothing the surface of the heat insulation coating HC. However, if the smoothing process is performed, an increase in man-hours is unavoidable. In addition, there is a possibility that the network structure is damaged during the smoothing process. For these reasons, the secondary particles having a particle diameter exceeding the upper limit Rmax are not included in the structure 30.

Here, the horizontal axis in FIG. 4 is a logarithmic axis. In the horizontal axis of FIG. 4, a group of the secondary particles 32 having a diameter smaller than a boundary value (e.g., several 100 nm) is expressed as a small diameter group $G_S$, and a group of the secondary particles 32 having a diameter larger than the boundary value is expressed as a large diameter group $G_L$. This boundary value is a value larger than a mode value Rmode. The boundary value is, for example, an average particle size of the secondary particles 32. Then, it is desirable that total number $N_{GS}$ of the secondary particles 32 belonging to the small diameter group $G_S$ is $10^4$ to $10^5$ times the total number $N_{GL}$ of the particles belonging to the large diameter group $G_L$.

When the total number $N_{GS}$ is $10^4$ to $10^5$ times the total number $N_{GL}$, a dense structure in which the secondary particles 32 belonging to the small diameter group $G_S$ enter the interstices formed between the secondary particles 32 belonging to the large diameter group $G_L$ is formed. Therefore, the filling rate of the secondary particles 32 can be further increased. Therefore, the strength of the heat insulation coating HC can be further increased.

The particle size distribution of the secondary particles 32 is measured by a particle size distribution measuring apparatus of a laser diffraction/scattering type.

Also, the total number of particles $N_{GS}$ and $N_{GL}$ are estimated based on the silica aerogel prior to the step of preparing the slurry. For example, silica aerogel particles are classified into the small diameter group $G_S$ and the large diameter group $G_L$ by a classification method, and the total number of particles belonging to both groups is measured by combining them with various measurement methods. Examples of various measurement methods include small-angle X-ray scattering (SAXS) and dynamic-light scattering (DLS). Scanning electron microscopy (SEM) and atomic force microscopy (AFM) may be combined with the classification method.

(ii) Silica-Based Binder

The silica-based binder is obtained by heat treatment of an aqueous solution of a silicic inorganic binder. The silicic inorganic binder enters between the particles of the silica aerogel (i.e., between the particles of the secondary particles 32). When the binder component is cured by a heat treatment, the particles of the silica aerogel are bonded to each other through the binder component.

Examples of the silicic inorganic binder includes a binder obtained by treating an aqueous solution of silicate with a cation exchange resin and dealkalizing (e.g., removing Na ions). Examples of the silicate include sodium silicate (water glass), alkali metal silicate such as potassium silicate, and organic base silicate such as quaternary ammonium silicate.

2.2 Second Configuration Example

Figure 5:
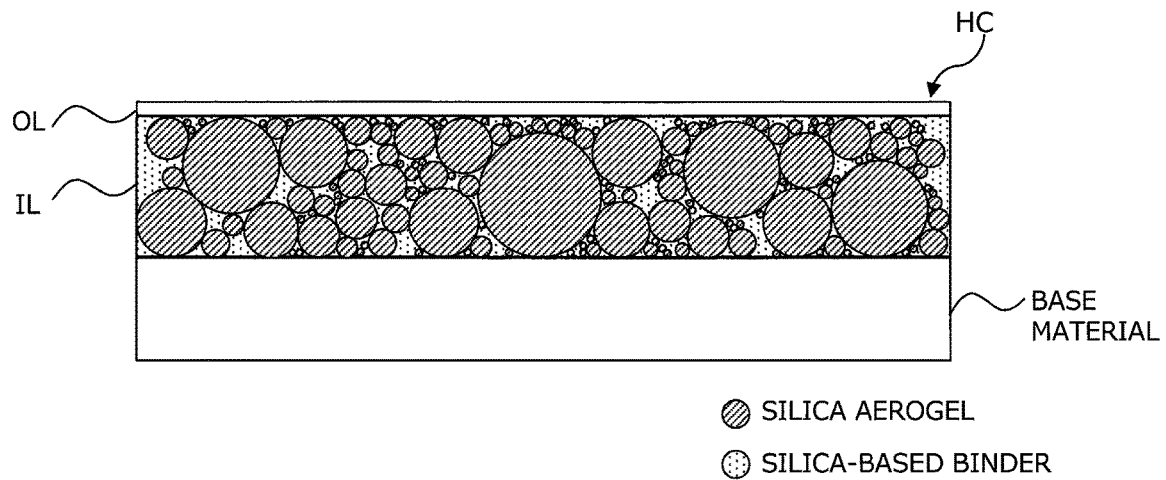
FIG. 5 is a schematic diagram for explaining a second configuration example of the heat insulation coating HC.

FIG. 5 is a schematic diagram for illustrating a second configuration example of the heat insulation coating HC. As shown in FIG. 5, the heat insulation coating HC is formed on the surface of the base material. The heat insulation coating HC shown in FIG. 5 includes the particles of the silica aerogel (i) and the silica-based binder (ii). Up to this point, the second configuration example is the same as the first one.

In the second configuration example, the particles of the silica aerogel (i) and the silica-based binder (ii) constitute an inner layer IL. And an outer layer OL is provided on the inner layer IL. The outer layer OL constitutes an outermost surface of the heat insulation coating HC. A coating thickness $T_{IL}$ of the inner layer IL is about the same as the coating thickness $T_{HC}$ (i.e., several 10 to several 100 μm). A coating thickness $T_{OL}$ of the outer layer OL is several 10 μm.

On the surface of the inner layer IL, interstices formed between the particles of the silica aerogel (i) form openings. The outer layer OL is formed to seal the openings. The outer layer OL is formed by coating an aqueous solution containing a silicon-based compound on the surface of the inner layer IL. Examples of the silicon-based compound include polysilazane compounds and polysiloxanes.

When the openings are exposed, gas generated by the combustion of the air-fuel mixture (i.e., combustion gas) is able to enter inside of the heat insulation coating HC through the openings. In this respect, according to the outer layer OL, gas barrier property of the heat insulation coating HC can be improved. In addition, according to the outer layer OL, surface roughness of the outermost surface can be improved.

2.3 Third Configuration Example

Figure 6:
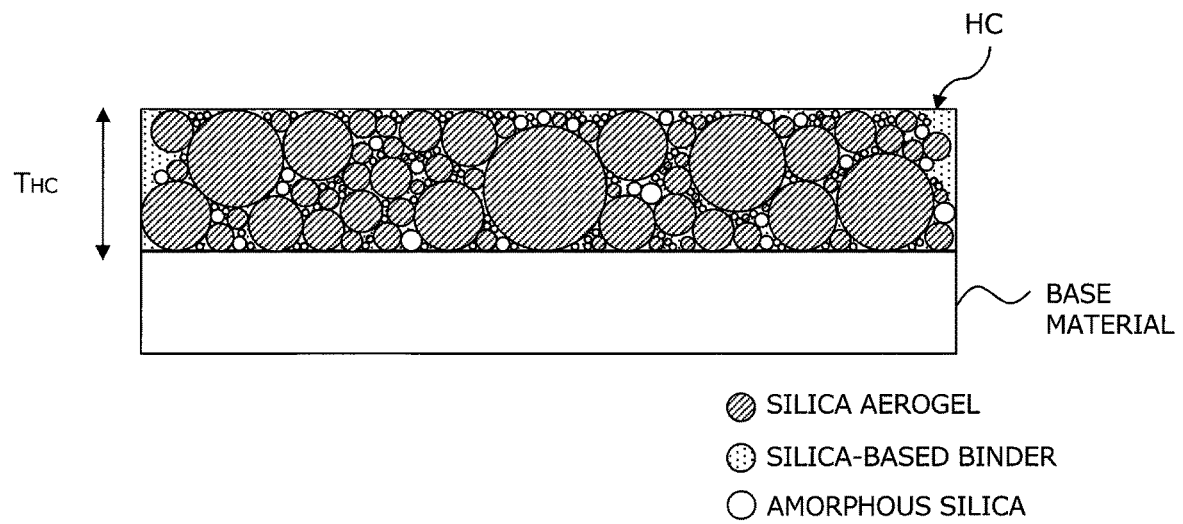
FIG. 6 is a schematic diagram for explaining a third configuration example of the heat insulation coating HC.

FIG. 6 is a schematic diagram for explaining a third configuration example of the heat insulation coating HC. As shown in FIG. 6, the heat insulation coating HC is formed on the surface of the base material. Up to this point, the configuration example is the same as the first one.

In the third configuration example, the heat insulation coating HC includes the particles of the silica aerogel (i), the silica-based binder (ii), and a particulate amorphous silica (iii). Particles of the particulate amorphous silica (iii) are disposed in the interstices formed between the particles of the silica aerogel (i). The particulate amorphous silica (iii) is provided in a form that replaces a portion of the particles of the silica aerogel (i).

(iii) Particulate Amorphous Silica

Particulate amorphous silica is a type of amorphous silica that is also used as a raw material for silica aerogels. Examples of the particulate amorphous silica include fumed silica. The fumed silica is obtained by hydrolyzing $SiCl_4$ gas by a flame at 1100 to 1400° C. in which a mixed gas including $H_2$ and $O_2$ is combusted. The fumed silica is a secondary particle formed by aggregating primary particles of silica having an average particle diameter of 5 to 50 nm. The secondary particles have an average particle diameter of several 10 to several 100 nm.

Due to differences in manufacturing process, porosity of the structure in which the particulate amorphous silica is assembled is lower than that of the structure in which the silica aerogel is assembled (i.e., the structure 30). Specifically, the porosity of the structure of the silica aerogel is 90% or more, whereas that of the structure of the particulate amorphous silica is 80 to 90%.

The relatively low porosity means that the structure is relatively robust. Also, although the porosity is relatively low, a gap in the porosity between the two structures is small. Therefore, according to the third configuration example with the particulate amorphous silica, it is possible to increase the strength of the heat insulation coating HC without substantially lowering the heat insulation property of the heat insulation coating HC.

3. Advantageous Effect of Heat Insulation Coating

According to the heat insulation coating of the present embodiment, the particle diameter of the secondary particles of the silica aerogel is widely distributed in the range of the lower limit Rmin to the upper limit Rmax. The fact that the particle diameters are widely distributed in the range of the lower limit Rmin to the upper limit Rmax means that the secondary particles of various sizes are mixed. If the secondary particles of various sizes are mixed, the filling rate of the secondary particles in the heat insulation coating can be improved as compared with a case where only the secondary particles having uniform particle diameters are present.

If only secondary particles of very small diameter are used, the filling rate of the secondary particles in the heat insulation coating is certainly improved. However, it is undesirable to prepare secondary particles having a very small diameter because this leads to an increase in manufacturing cost. In this respect, according to the heat insulation coating of the present embodiment, such troublesome preparation is unnecessary. Therefore, it is possible to improve the filling rate of the secondary particles in the heat insulation coating while suppressing the manufacturing cost.

If the filling rate of the secondary particles in the heat insulation coating is improved, the heat insulation coating can be provided with high heat-insulating properties derived from the structure while increasing the strength of the structure of the silica aerogel.

Figure 7:
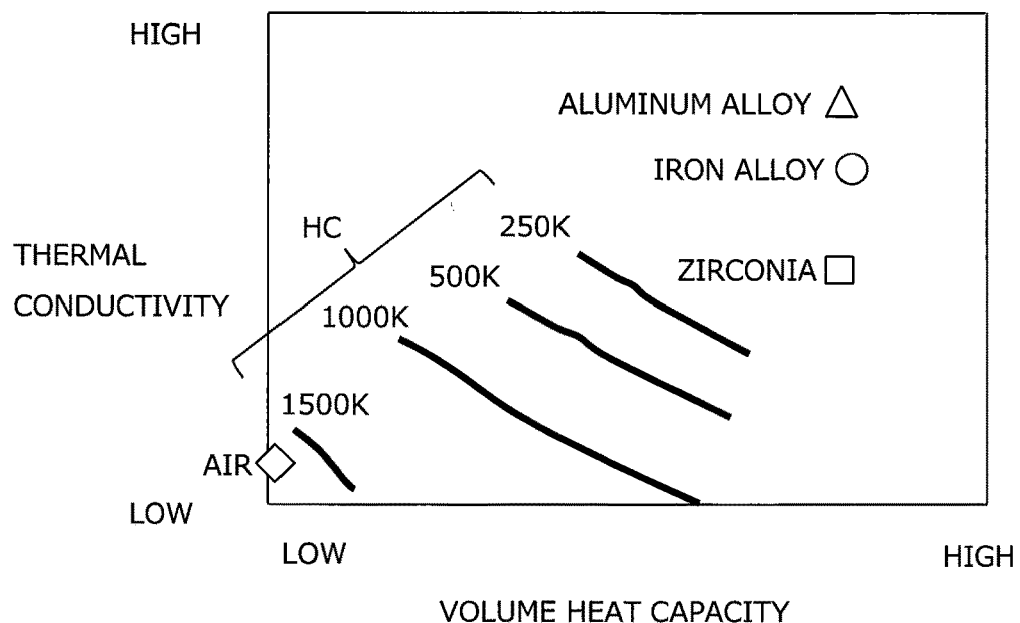
FIG. 7 is a diagram for showing thermal characteristic data of the heat insulation coating according to the embodiment of the present disclosure.

FIG. 7 is a diagram for showing thermal characteristic data of the heat insulation coating according to the present embodiment. The data shown in FIG. 7 were obtained using a sample of the heat insulation coating corresponding to the first configuration example. As shown in FIG. 7, the volume heat capacity of the heat insulation coating is lower than that of comparative alloys (i.e., aluminum-based alloys, iron-based alloys) and zirconia at each temperature. The thermal conductivity of the heat insulation coating is lower than the comparative alloy at each temperature. That is, the heat insulation coating can achieve a lower volume heat capacity and a lower thermal conductivity than the comparative alloy at each temperature.

The low volume heat capacity and thermal conductivity means that the temperature of the heat insulation coating can be made to follow the temperature of working gas in the combustion chamber. That is, in an expansion stroke of the engine, it is possible to make the temperature of the heat insulation coating follow the temperature of the combustion gas that rises. Further, in an intake stroke of the engine, it is possible to make the temperature of the heat insulation coating follow a relatively low intake air temperature. Therefore, it is possible to reduce cooling loss and suppress heating of the intake air at the same time.

Figure 8:
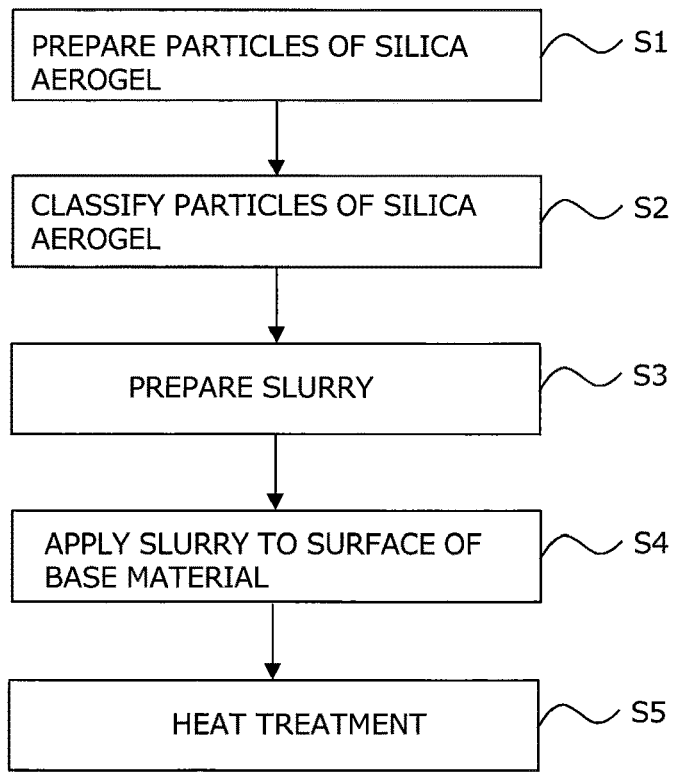
FIG. 8 is a diagram for explaining a process flow for forming the heat insulation coating according to an embodiment of the present disclosure.

Next, an embodiment of a process for forming a heat insulation coating for internal combustion engine according to the present disclosure will be described with reference to FIG. 8.

4. Forming Process for Heat Insulation Coating

The forming process according to the present embodiment is a process for obtaining the heat insulation coating of the first configuration example described with reference to FIG. 2. FIG. 8 is a diagram for explaining a flow of the forming process according to the present embodiment. As shown in FIG. 8, the forming process according to the present embodiment includes a first step (i), a second step (ii), a third step (iii), a fourth step (iv), and a fifth step (v). The first step (i) to the fifth step (v) are performed in this order.

(i) First Step

In the first step S1, the particles of the silica aerogel are prepared. Silica aerogels are prepared, for example, as follows. First, a metal alkoxide such as sodium silicate or tetramethoxysilane is prepared as a gel raw material. Subsequently, the gel raw material is mixed in a solvent such as water or alcohol to which a catalyst is added, and reacted to obtain a wet gel. Then, the solvent in the wet gel is removed by a supercritical drying method.

(ii) Second Step

In the second step S2, the particles of the silica aerogel are classified. The classification is performed by dividing the particles of the silica aerogel into three particle groups. The three particle groups include a group in which the particle diameter is below the lower limit Rmin, a group in which the particle diameter is above the upper limit Rmax, and a group in which the particle diameter is between the lower limit Rmin and the upper limit Rmax.

In the second step S2, after the classification, it is desirable to measure the particle size distributions of the particle group from the lower limit Rmin to the upper limit Rmax to specify the mode value Rmode. Further, it is desirable to measure the total number of particles included in this particle group, and adjust one or both of these total numbers so that the magnitude relationship between the total number of particles $N_{GS}$ and $N_{GL}$ falls within the ranges described above.

After the second step S2 and before the third step S3, it is desirable to perform hydrophobizing of the particles of the silica aerogel. The hydrophobizing is a treatment in which a hydrophobic group (e.g., hydrocarbon group, cycloalkyl group, aryl group, or the like) is introduced into the particles of the silica aerogel. The introduction of the hydrophobic group is carried out by treating the particles of the silica aerogel with a coupling agent having a hydrophobic group.

When the hydrophobizing is performed, it is possible in the third step to suppress the binder component from entering the interstices (i.e., the interstices 36) of the particles of the silica aerogel (i.e., the secondary particles 32). Therefore, it is possible to suppress the interstices from being blocked.

(iii) Third Step

In the third step S3, a slurry is prepared. The slurry is prepared by dispersing the particles of the silica aerogel in the aqueous solution of the siliceous inorganic binder.

In the third step S3, the particulate amorphous silica may be further dispersed in the aqueous solution of the siliceous inorganic binder. When the particulate amorphous silica is added, the heat insulation coating described as the third configuration example is obtained.

(iv) Fourth Step

In the fourth step S4, the slurry is coated on the surface of the base material. The coating method is not particularly limited, and a known method can be used. Known methods include brushing, spray coating, dipping coating, float coating, and spin coating.

(v) Fifth Step

In the fifth step S5, a heat treatment is performed. When the heat treatment is performed, moisture evaporates and the binder component is cured to bond the particles of the silica aerogel. As a result, the heat insulation coating HC is formed.

After the fifth step S5, the aqueous solution containing the silicon-based compound may be coated on the surface of the heat insulation coating. When water in the aqueous solution evaporates, an outer layer (i.e., the outer layer OL) is formed. That is, when the aqueous solution is applied, the heat insulation coating described as the second configuration example is obtained.

5. Advantageous Effect of Forming Process for Heat Insulation Coating

According to the forming process of the present embodiment, the particles of the silica aerogel having the particle diameter from the lower limit Rmin to the upper limit Rmax are classified in the second step S2. Therefore, it is possible to obtain the heat insulation coating in which the secondary particles of various sizes are mixed. Further, the classification of the particles of the silica aerogel itself is not a complicated process. Therefore, the forming process according to the present embodiment is also excellent in terms of high practical use.

What is claimed is:

1. A heat insulation coating for internal combustion engine which is formed to a predetermined thickness on a wall surface of a combustion chamber, comprising:
    particles of a silica aerogel having a particle diameter distributed in a predetermined range; and
    a silica-based binder that binds the particles of the silica aerogel to each other,
    wherein a lower limit of the predetermined range is several 10 nm,
    wherein an upper limit of the predetermined range is 10 µm or more, and is equal to the predetermined thickness,
    wherein the particles of the silica aerogel are composed of a small diameter group having a particle diameter smaller than several 100 nm and a large diameter group having a particle diameter larger than several 100 nm, and
    wherein total number of the particles of the silica aerogel belonging to the small diameter group is $10^4$ to $10^5$ times that of the silica aerogel belonging to the large diameter group.

2. The heat insulation coating according to claim 1, further comprising particulate amorphous silica provided in interstices formed between the particles of the silica aerogel.

3. A heat insulation coating for internal combustion engine which is formed to a predetermined thickness on a wall surface of a combustion chamber, comprising:
- particles of a silica aerogel having a particle diameter distributed in a predetermined range; and
- a silica-based binder that binds the particles of the silica aerogel to each other,
- wherein a lower limit of the predetermined range is several 10 nm,
- wherein an upper limit of the predetermined range is 10 μm or more, and is equal to the predetermined thickness,
- wherein the particles of the silica aerogel and the silica-based binder constitute an inner layer,
- wherein interstices formed between the particles of the silica aerogel form openings in a surface of the inner layer,
- wherein a silica-based outer layer for sealing the openings is formed on the surface.

4. The heat insulation coating according to claim 3, further comprising particulate amorphous silica provided in interstices formed between the particles of the silica aerogel.

5. A process for forming a heat insulation coating for internal combustion engine which is formed to a predetermined thickness on a wall surface of a combustion chamber, the process comprising the steps of;
- classifying particles of prepared silica aerogel into particles having a particle size within a predetermined range;
- preparing a slurry including the particles of the classified silica aerogel and an aqueous solution of a siliceous inorganic binder; and
- applying the prepared slurry to the wall surface,
- wherein a lower limit of the predetermined range is several 10 nm.
- wherein an upper limit of the predetermined range is 10 μm or more, and is equal to the predetermined thickness,
- wherein the particles of the silica aerogel are composed of a small diameter group having a particle diameter smaller than several 100 nm and a large diameter group having a particle diameter larger than several 100 nm, and
- wherein total number of the particles of the silica aerogel belonging to the small diameter group is $10^4$ to $10^5$ times that of the silica aerogel belonging to the large diameter group.

6. The process according to claim 5, wherein the slurry further including particulate amorphous silica having a particle diameter of several 10 to several 100 nm.

7. The process according to claim 5, wherein the process further comprising the step of hydrophobizing the classified silica aerogel particles between the step of classifying the particles of prepared silica aerogel the silica aerogel particles and the step of preparing the slurry.

* * * * *